(12) United States Patent
Lobanoff et al.

(10) Patent No.: US 6,637,377 B2
(45) Date of Patent: Oct. 28, 2003

(54) ANIMAL RESTRAINT SYSTEM FOR VEHICLES

(75) Inventors: Mark Lobanoff, Troy, MI (US); Ronald S. Gulette, Farmington Hills, MI (US)

(73) Assignee: BOS Automotive Products, Inc., Rochester Hills, MI (US)

( * ) Notice: Subject to any disclaimer, the term of this patent is extended or adjusted under 35 U.S.C. 154(b) by 0 days.

(21) Appl. No.: 10/072,943

(22) Filed: Feb. 13, 2002

(65) Prior Publication Data

US 2003/0150399 A1 Aug. 14, 2003

(51) Int. Cl.⁷ .................... A01K 15/04; A62B 35/00
(52) U.S. Cl. ............... 119/792; 119/770; 119/771; 119/850; 119/907; 297/465
(58) Field of Search ............... 119/792, 793, 119/770, 771, 850, 907; 2/463, 92, 102; D2/828, 829; 297/482, 465–483, 484, 487, 488

(56) References Cited

U.S. PATENT DOCUMENTS

|   |   |   |   |   |
|---|---|---|---|---|
| 225,715 A | | 3/1880 | Middleton | |
| 354,394 A | | 12/1886 | Collie | |
| 623,596 A | | 4/1899 | Covington | |
| 1,906,043 A | | 4/1933 | Bernstein | |
| 2,184,404 A | * | 12/1939 | Stricker | 297/465 |
| 2,567,400 A | * | 9/1951 | Rahe | 297/465 |
| 3,189,003 A | | 6/1965 | Canfield | |
| 3,310,034 A | | 3/1967 | Dishart | |
| 3,332,398 A | * | 7/1967 | Mintz | 119/797 |
| 3,529,864 A | * | 9/1970 | Rose et al. | 297/467 |
| 3,590,783 A | | 7/1971 | Purgett | |
| 3,722,478 A | | 3/1973 | Smith | |
| 3,769,938 A | * | 11/1973 | Hudziak et al. | 128/874 |
| 4,292,932 A | | 10/1981 | Wooderson | |
| 4,324,204 A | * | 4/1982 | Friedman | 119/771 |
| 4,385,592 A | * | 5/1983 | Goldstein | 602/18 |
| 4,445,866 A | * | 5/1984 | Cillieres | 434/253 |
| D277,424 S | * | 2/1985 | Beker | D2/829 |
| 4,512,286 A | * | 4/1985 | Rux | 119/771 |
| 4,537,154 A | | 8/1985 | Kay | |
| 4,597,359 A | | 7/1986 | Moorman | |
| 4,715,618 A | | 12/1987 | Harris | |
| 4,738,413 A | | 4/1988 | Spinosa et al. | |
| 4,817,562 A | | 4/1989 | Giroux | |
| 4,879,972 A | * | 11/1989 | Crowe et al. | 119/792 |
| 4,907,541 A | | 3/1990 | Thompson | |
| 4,970,991 A | | 11/1990 | Luce | |
| 5,073,985 A | * | 12/1991 | Stone et al. | 2/2.5 |
| 5,154,660 A | | 10/1992 | Snyder et al. | |
| 5,331,683 A | * | 7/1994 | Stone et al. | 2/2.5 |
| 5,427,061 A | | 6/1995 | McCullough | |

(List continued on next page.)

FOREIGN PATENT DOCUMENTS

| FR | 2233931 | 6/1973 |
|---|---|---|
| WO | WO 92/02128 | 2/1992 |
| WO | WO 98/29281 | 7/1998 |

OTHER PUBLICATIONS

Allsafe Hunde–Sicherheitsgurt.
CanineAuto.com.
Four Paws, Pet Safety Sitter.
Four Paws, Safety Seat Vest Harness.
Roadie brochure page.

*Primary Examiner*—Yvonne Abbott
(74) *Attorney, Agent, or Firm*—Harness, Dickey & Pierce, PLC

(57) ABSTRACT

An animal restraint system for a vehicle has a vest having leg holes for front legs of an animal. The vest is symmetrical about the leg holes allowing the vest to be rotated 180 degrees and placed on the animal in either orientation. The vest is removably couplable to a seat belt of the vehicle by a tether strap that has at least one loop through which the seat belt of the vehicle is passed through. The tether strap clips to a top strap of the vest that extends from one side of the vest to the other side of the vest across the back of the animal.

24 Claims, 4 Drawing Sheets

U.S. PATENT DOCUMENTS

| | | | |
|---|---|---|---|
| 5,429,417 A | * 7/1995 | Kim | 297/440.1 |
| 5,443,037 A | 8/1995 | Saleme | |
| 5,479,892 A | 1/1996 | Edwards | |
| 5,529,018 A | 6/1996 | Butts | |
| 5,611,298 A | 3/1997 | Sporn | |
| 5,613,467 A | 3/1997 | Arakawa | |
| 5,724,920 A | 3/1998 | Meisman et al. | |
| 5,794,571 A | 8/1998 | Goldberg | |
| 5,813,367 A | 9/1998 | O'Brien | |
| 5,893,339 A | 4/1999 | Liu | |
| 5,894,817 A | * 4/1999 | Manuel | 119/497 |
| 5,911,200 A | 6/1999 | Clark | |
| 5,913,285 A | 6/1999 | Pritchard | |
| 5,915,335 A | 6/1999 | Holt, Jr. | |
| 6,101,979 A | 8/2000 | Wilson et al. | |
| 6,123,049 A | 9/2000 | Slater | |
| 6,164,245 A | 12/2000 | Johnson | |
| 6,253,713 B1 | 7/2001 | Giedeman, III et al. | |
| 6,397,389 B1 | * 6/2002 | Schultz | 2/69 |
| 6,443,101 B1 | * 9/2002 | Fazio | 119/792 |
| 6,467,437 B2 | * 10/2002 | Donovan et al. | 119/798 |
| 6,477,988 B2 | * 11/2002 | Burnett | 119/850 |

* cited by examiner though the invention relates to animal restraints, and more particularly, to animal restraint systems for vehicles.

ANIMAL RESTRAINT SYSTEM FOR VEHICLES

FIELD OF THE INVENTION

The present invention relates to animal restraints, and more particularly, to animal restraint systems for vehicles.

BACKGROUND OF THE INVENTION

Animals (particularly pets) are often transported in the passenger compartment of vehicles. If the animal is unrestrained, this presents a danger to both the animal and the human occupants of the vehicle. An unrestrained animal can interfere with the driver of the vehicle, such as by jumping on the driver's lap. Also, in the event that vehicle brakes suddenly, makes a sudden maneuver, or comes to a sudden stop such as in the case of an accident, the unrestrained animal may be thrown about the passenger compartment of the vehicle. This can injure the animal. It can also injure a human occupant if the animal is thrown into this occupant with enough force. It can also cause the driver to lose control of the vehicle if the animal is thrown into the driver when the driver is attempting to bring the vehicle to a stop or maneuvering the vehicle.

It is an object of this invention to provide an animal restraint system for a vehicle that restrains the animal from moving about the passenger compartment of the vehicle and also restrains the animal from being thrown about the passenger compartment of the vehicle if the vehicle suddenly brakes, maneuvers or stops.

SUMMARY OF THE INVENTION

An animal restraint system for a vehicle has a vest having leg holes for front legs of an animal. The vest is symmetrical about the leg holes allowing the vest to be rotated 180 degrees and placed on the animal in either orientation. The vest is removably couplable to a seat belt of the vehicle.

In an aspect of the invention, the vest is spherically shaped to provide the symmetry about the leg holes of the vest.

In an aspect of the invention, the animal restraint system includes a tether strap for removably coupling the vest to the seat belt of the vehicle. The tether strap has one or more loops with the seat belt of the vehicle being passed through one of the loops to removably couple the tether strap to the seat belt.

In an aspect of the invention, the vest includes a vest jacket and reinforcing straps secured to the vest jacket.

In an aspect of the invention, a top strap extends across a back of an animal from a first side of the vest jacket above one of the leg holes to a second side of the vest jacket above the other leg hole when the vest is on the animal to secure the vest to the animal. The tether strap is removably coupled to the top strap.

In an aspect of the invention, the top strap includes a first end that is removably coupled to a first side of the vest jacket above one of the leg hole by a buckle and a second end coupled to a second side of the vest jacket above the other leg hole by a strap length adjuster.

In an aspect of the invention, the animal restraint system can be left in the vehicle coupled to the seat belt and then easily and rapidly secured to the animal by placing the front legs of the animal into the leg holes of the vest jacket and buckling the top strap.

In an aspect of the invention, the animal restraint system has two top straps. The top straps are coupled to a first side of the vest jacket above one of the leg holes by individual buckles and to a second side of the vest jacket above the other leg hole by individual strap length adjusters.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
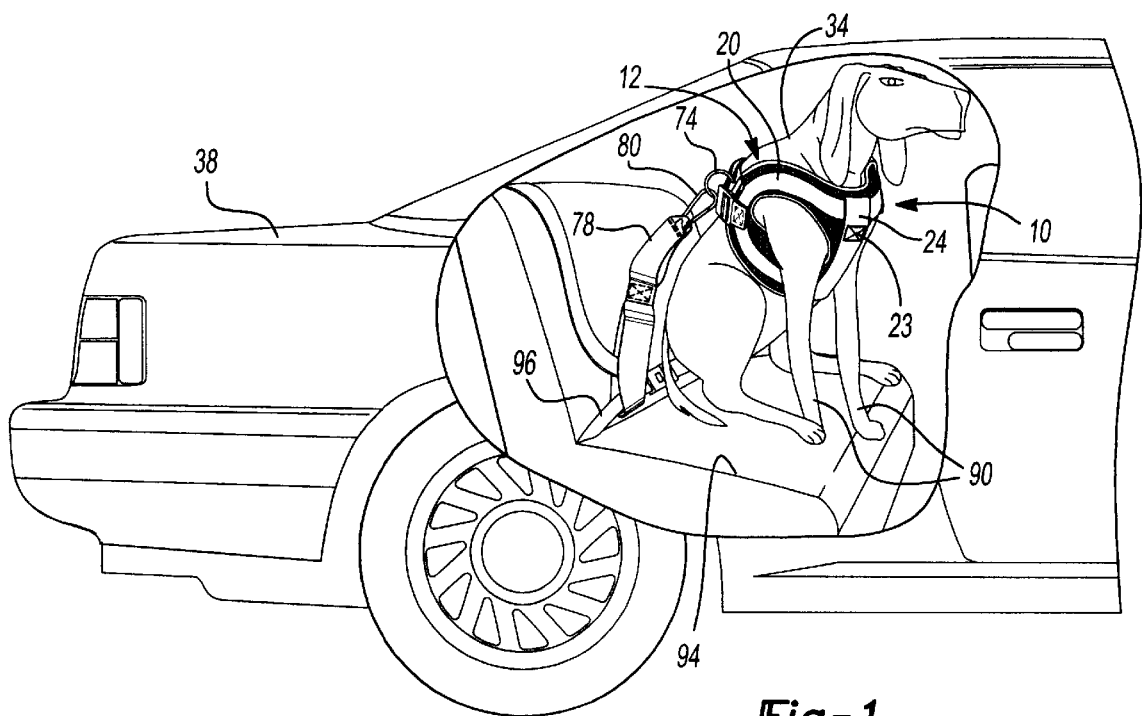
FIG. 1 is a perspective view of an animal restraint system in accordance with the invention.
Figure 2:
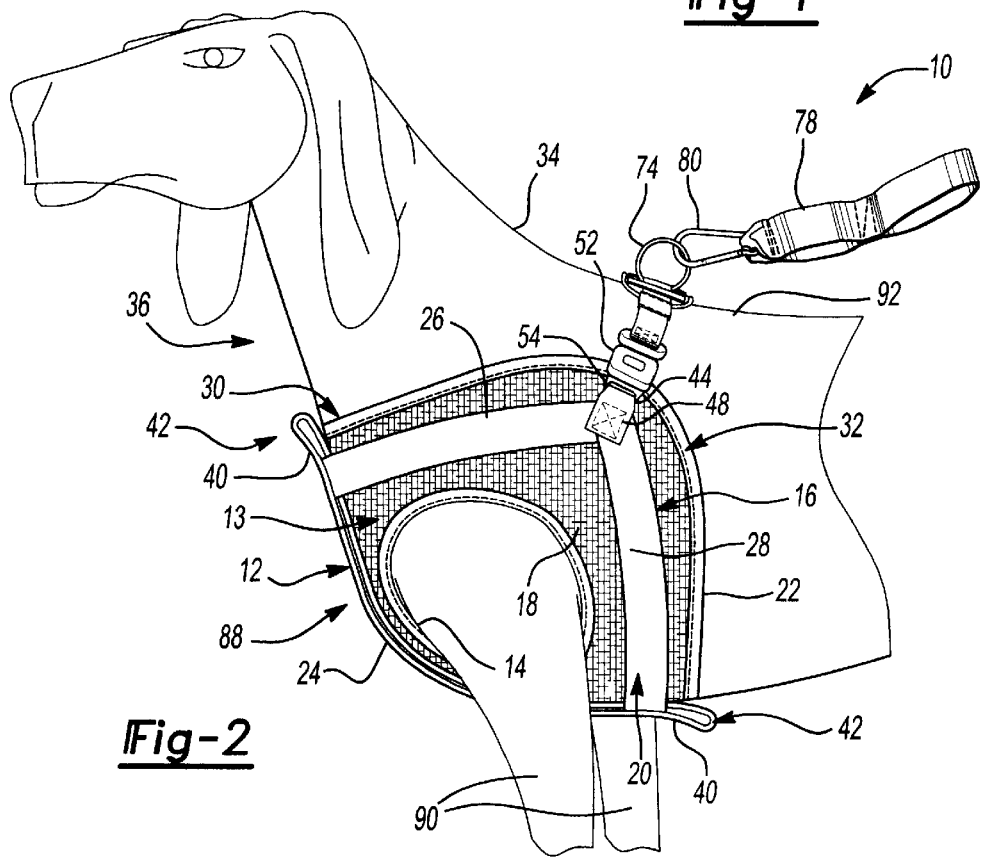
FIG. 2 is a side view of the animal restraint system of FIG. 1.
Figure 3:
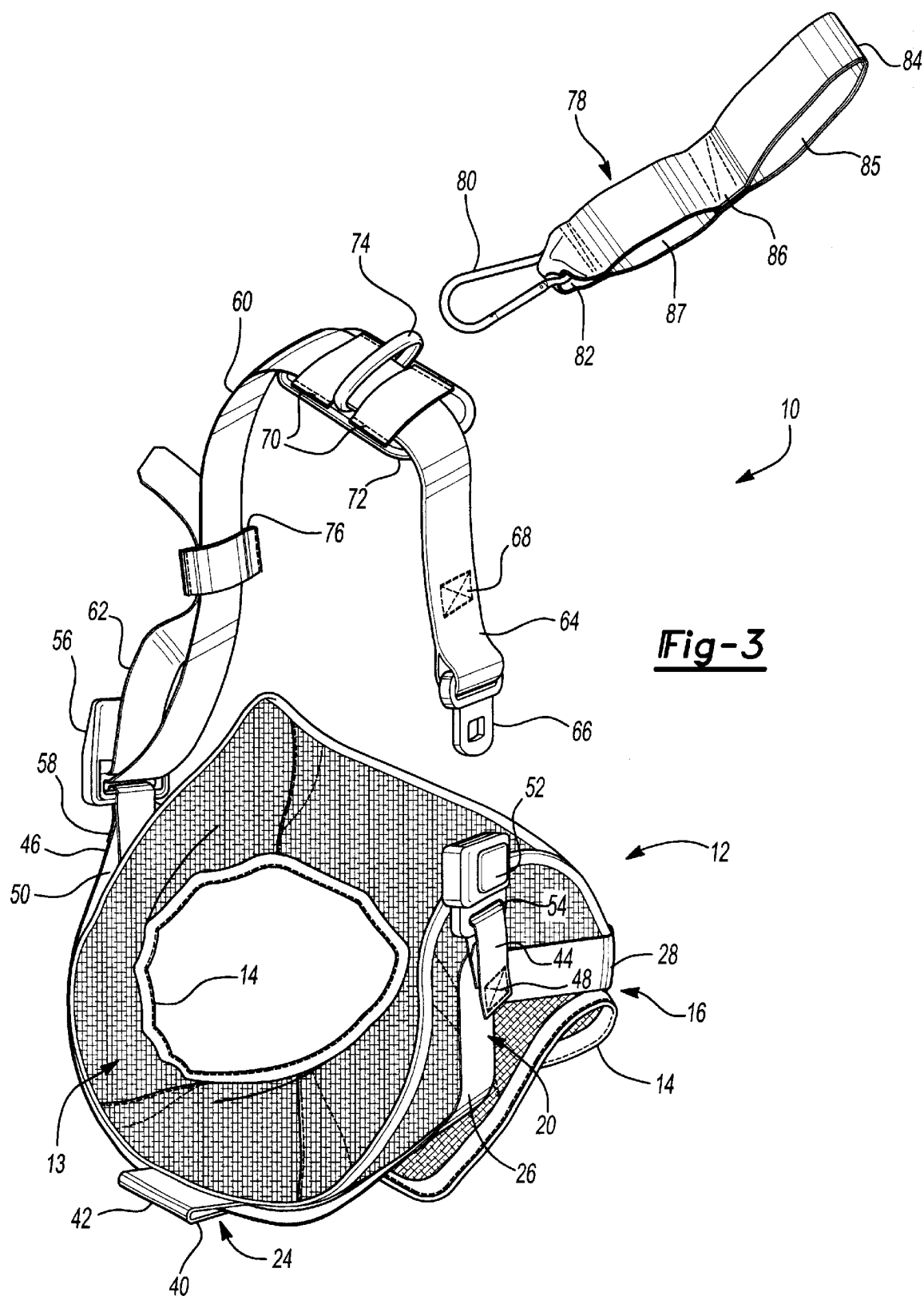
FIG. 3 is another perspective view of the animal restraint system of FIG. 1.

FIGS. 1–3 show an animal restraint system 10 for vehicles in accordance with the invention. Animal restraint system 10 includes a vest 12 having leg holes 14 for front legs 90 of animal 34. Vest 12 is symmetrical about leg holes 14. Illustratively, vest 12 is spherical in shape, that is, has a spherical radius, to provide this symmetry. Vest 12 includes a vest jacket 13 with reinforcing straps 16 secured to an outer side 18. Reinforcing straps 16 include peripheral strap 20 extending around vest jacket 13 adjacent a periphery 22 of vest jacket 13 and a chest strap 24 extending between leg holes 14.

Peripheral strap 20 illustratively includes a first strap 26 extending around a first side 30 of vest jacket 13 adjacent periphery 22 and a second strap 28 extending around a second side 32 of vest jacket 13 near periphery 22. As oriented in FIG. 2, first side 30 of vest jacket 13 is a front side of vest jacket 13 and second side 32 of vest jacket 13 is a rear side of vest jacket 13. As mentioned, however, vest 12 is symmetrical about leg holes 14 and can be placed on animal 34 with either first side 30 or second side 32 of vest jacket 13 at a front 36 of animal 34.

First and second straps 26, 28 of peripheral strap meet above each leg hole 14 and are stitched together and to vest jacket 13 thereat. It should be understood that other means of securement can be used, such as rivets. Chest strap 24 extends across vest jacket 13 between leg holes 14 from first strap 26 of peripheral strap 20 to second strap 28 of peripheral strap 20. Chest strap 24 and first and second straps 26, 28 of peripheral strap 20 are stitched together and to vest jacket 13 where they meet. Although peripheral strap 20 and chest strap 24 are illustratively secured to vest jacket 13 and to each other by stitching, it should be understood that other means of securing peripheral strap 20 and chest strap 24 to each other and to vest jacket 13 can be utilized, such as rivets.

Vest jacket 13 is illustratively made of a nylon netting and reinforcing straps 16 illustratively made of a polyester webbing of the type used in vehicle restraint systems. Vest jacket 13 and reinforcing straps 16 are sized to withstand the forces generated by sudden braking, maneuvering or stopping of a vehicle, such as vehicle 38.

One of the areas of maximum force during sudden braking, maneuvering or stopping of vehicle 38 is chest 88 of animal 34. Chest strap 24 is thus illustratively a strap that is doubled back on itself to comprise a double strap so that loops 40 are formed at opposed ends 42 of chest strap 24. The ends of the this strap are secured to each other at 23, such as by stitching. Other means of securement can be used, such as rivets. Peripheral strap 20 extends through loops 40 and is secured to chest strap 24 and vest jacket 13 thereat, such as by stitching. Other means of securement can be used, such as rivets. Although vest 12 has been described in the context of a vest jacket with reinforcing straps 16, it should be understood that vest 12 could comprise reinforcing straps 16 without vest jacket 13, with reinforcing straps 16 symmetrical about leg holes 14.

Attachment straps 44, 46 are secured at respective ends 48, 50, respectively to vest jacket 13 and peripheral strap 20 where first and second straps 26, 28 of peripheral strap 20 join together above leg holes 14. Attachment straps 44, 46 are illustratively secured to vest jacket 13 and peripheral strap 20 by stitching, although other means of securement can be used, such as rivets.

Attachment strap 44 has a buckle 52 secured to an end loop 54 of attachment strap 44. Illustratively, attachment strap 44 loops through buckle 52 and is secured to itself, by stitching, riveting, or other securement means, to secure buckle 52 to second end 54 of attachment strap 44. Attachment strap 46 has a strap length adjuster 56 secured to an end loop 58 of attachment strap 46. Buckle 52 is illustratively a buckle of the type used in vehicle restraint systems, such as seat belts or child car seats, and strap length adjuster 56 is a strap length adjuster of the type used in vehicle restraint systems.

Animal restraint system 10 also includes a top strap 60; A first end 62 of top strap 60 is looped through strap length adjuster 56 to secure first end 62 of top strap 60 to strap length adjuster 56. First end 62 of top strap 60 can be pulled through strap length adjuster 56 in conventional fashion to adjust the length of top strap 60 that extends over animal 34. Top strap 60 has a second end 64 looped through a tongue 66 and secured to top strap 60 at 68, such as by stitching. Other means of securement could be used, such as rivets. Top strap 60 is illustratively made of a polyester webbing of the type used in vehicle restraint systems and is sized to withstand the forces generated by sudden braking, maneuvering or stopping of a vehicle, such as vehicle 34.

Top strap 60 passes through strap loops 70 of a pad 72 and an attachment loop 74 to slidably secure attachment loop 74 and pad 72 to top strap 60. Attachment loop 74 is disposed between strap loops 70 of pad 72. Top strap 60 also passes through a strap holder 76, which is illustratively two pieces of webbing stitched together so that strap holder 76 slides on top strap 60. First end 62 can be placed in strap holder 76 to hold it in place. Attachment loop 74 is made of material sufficiently strong to withstand the forces generated by sudden braking, maneuvering or stopping of a vehicle. Attachment loop 74 is illustratively made of steel, although it can be made of other materials.

Animal restraint system 10 includes a tether strap 78 to secure vest 12 to vehicle 38. Tether strap 78 has a clip 80 secured at a first end 82, illustratively, by looping tether strap 78 through clip 80. Tether strap 78 is illustratively a length of webbing looped back on itself twice to provide a quadruple thick strap which is secured together adjacent first end 82 and at a middle 86 of tether strap 78, such as by stitching. Other means of securement can be used, such as rivets. Tether strap 78 thus has a loop 85 at a second end 84 and a loop 87 between first end 82 and middle 86. Tether strap 78 is illustratively made of a polyester webbing of the type used in vehicle restraint systems and is sized to withstand the forces generated by sudden braking, maneuvering or stopping of a vehicle, such as vehicle 34.

As discussed below, seat belt 96 is inserted through loop 85 or loop 87 to secure tether strap 78 to seat belt 96. The two loops 85 and 87 allow for some adjustment in the length of tether strap 78 between vest 12 and seat belt 96, with the length of tether strap 78 between vest 12 and seat belt 96 being shorter when seat belt 96 is passed through loop 87 then when passed through loop 85. It should be understood that more loops can be provided in tether strap by securing together the webbing used for tether strap 78 at places in addition to middle 86 allowing for finer length adjustment. Clip 80 is made of material sufficiently strong to withstand the forces generated by sudden braking, maneuvering or stopping of a vehicle. Clip 80 is illustratively made of steel, although it can be made of other materials.

To use animal restraint system 10, vest 12 is placed over the chest 88 of animal 34 with front legs 90 of animal 34 extending through leg holes 14 of vest 12. Since vest 12 is symmetrical about leg holes 14, there is no true front or back. Vest 12 can thus be rotated 180 degrees front to back and placed on animal 34 in either orientation. The user of animal restraint system 10 thus need not determine the front or back of animal restraint system 10 when placing animal restraint system 10 on animal 34, which simplifies doing so.

After vest 12 is placed on animal 34, top strap 60 is brought over the back 92 of animal 38 and tongue 66 inserted into buckle 52. If this is the first time animal restraint system 10 is placed on animal 34, the length of top strap 60 is adjusted with adjuster strap length adjuster 56.

After animal restraint system 10 is placed on animal 34, animal 34 is placed on the rear seat 94 of vehicle 38. Seat belt 96, which illustratively includes a lap belt and shoulder belt, is inserted through loop 85 or loop 87 of tether strap 78, buckled and snugged. Clip 80 of tether strap 78 is clipped to attachment loop 74 of top strap 60, securing animal restraint system in vehicle 38.

Clip 80 of tether strap 78 can be unclipped from attachment loop 74 of top strap 60 to allow easy removal of animal 34 from vehicle 38. A leash (not shown) can be clipped to attachment loop 74. Alternatively, seat belt 96 can be unbuckled and tether strap 78 removed to allow removal of animal 34 from vehicle 38 and tether strap 78 can then be used as a leash.

Buckle 52 can also be unbuckled, allowing animal 34 to step out of vest 12. In this regard, animal restraint system 10 is left coupled to seat belt 96. Animal restraint system 10 can then be easily and rapidly secured to animal 34 by placing the front legs 90 of animal 34 through leg holes 14 of vest jacket 12 and inserting tongue 66 of top strap 60 into buckle 52.

Figure 4:
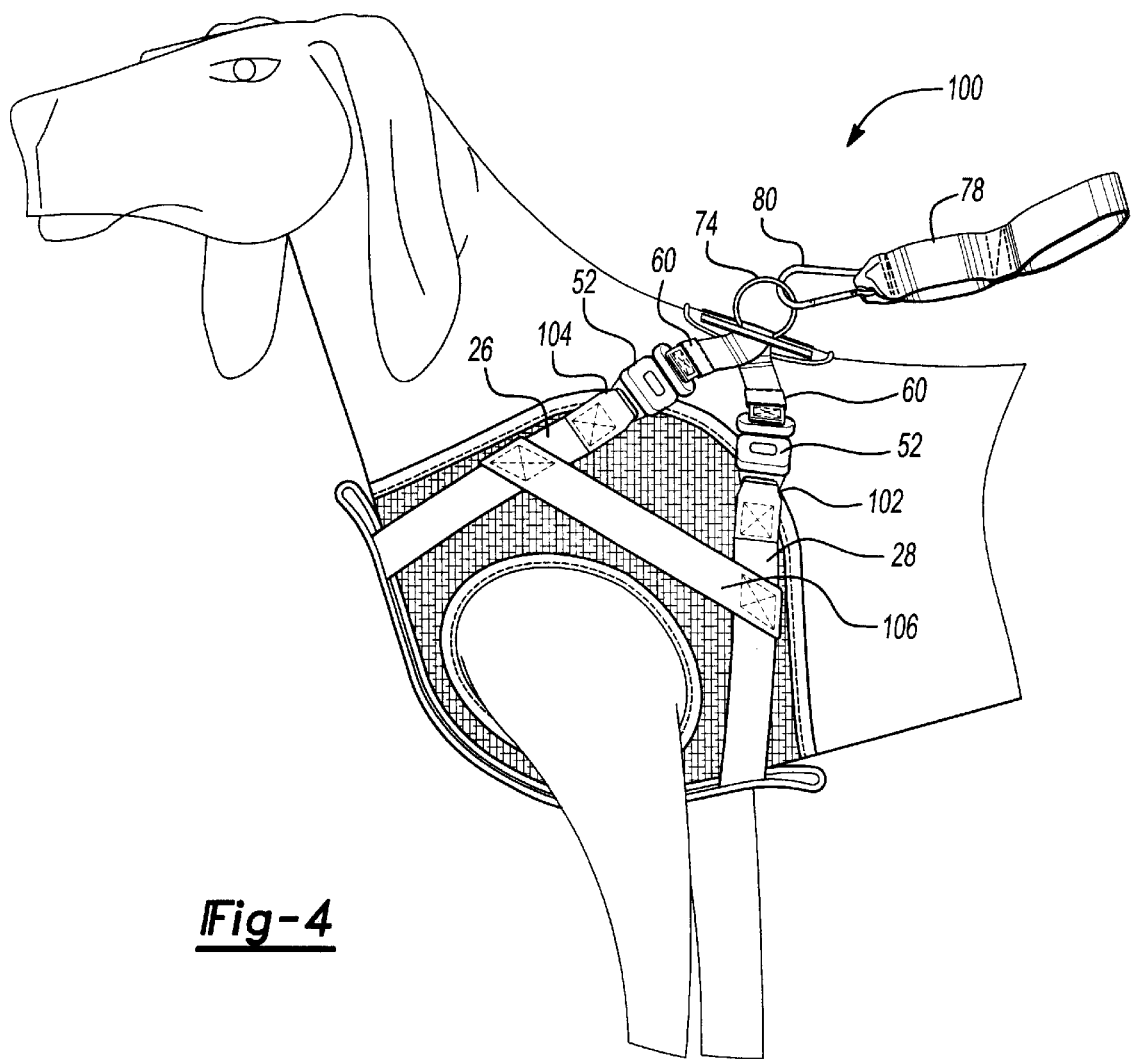
FIG. 4 is a side view of an animal restraint system in accordance with the invention.
Figure 5:
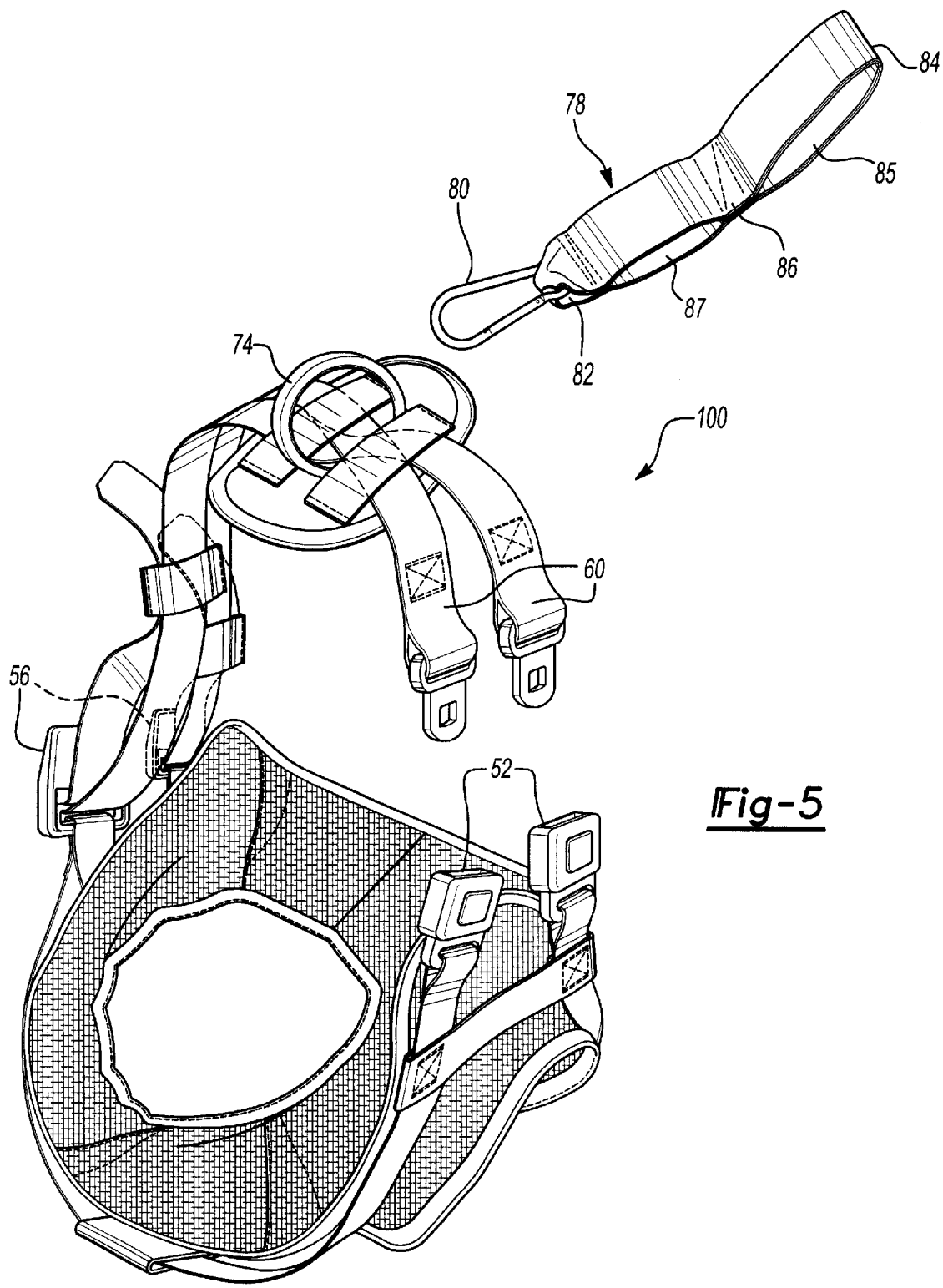
FIG. 5 is a perspective view of the animal restraint system of FIG. 4.

FIGS. 4 and 5 show an animal restraint system 100 for larger animals. Animal restraint system 100 is a variation of animal restraint system 10 and only the differences will be discussed. Like elements will be identified with the same reference numbers.

The main difference between animal restraint system 100 and animal restraint system 10 is that animal restraint system 100 has a four point harness system whereas animal restraint system 10 has a two point harness system. In this regard, top strap 60 of animal restraint system 100 is attached to vest jacket 13 and reinforcing straps 16 by two buckles 52 and two strap length adjusters 56. Illustratively, animal restraint system 100 has two top straps 60, with each top strap 60 passing through attachment loop 74. First strap 26 and second strap 28 of peripheral strap 20 of vest 12 are illustratively secured to outer side 18 of vest jacket 13 at separate points above leg holes 14, with buckles 52 secured to ends 102, 104 of first and second straps 26, 28, respectively. Attachment straps 44, 46 may thus be dispensed with. Similarly, strap length adjusters 56 are secured to the ends of first and second straps 26, 28 on the opposite side of vest jacket 13. The foregoing arrangement comprises the four point harness system.

Reinforcing straps 16 of vest 12 of animal restraint system 100 may include reinforcement straps 106 on opposite sides of vest jacket 13 (only one side being shown in FIG. 4) extending between first and second straps 26, 28 above leg holes 14. Reinforcement straps 106 are illustratively secured to first and second straps 26, 28 and vest jacket 13 by stitching. Other securement means can be used, such as rivets. Reinforcement straps 106 are also illustratively made of polyester webbing of the type used in vehicle restraint systems.

Animal restraint systems 10 and 100 restrain the animal 34 from moving about the passenger compartment of vehicle 38. Animal restraint systems 10, 100 also restrain the animal 34 in the event of a sudden maneuver, sudden braking, or sudden stop of the vehicle 38 and prevent the animal 34 from being thrown around the passenger compartment of the vehicle 38.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An animal restraint system for a vehicle, comprising a vest having leg holes for front legs of an animal, the vest having front and rear sides symmetrical about the leg holes such that the vest can be placed on the animal with either of its front and rear sides in front of the front legs of the animal, the vest removably secured to a seat belt of the vehicle when the animal restraint system is used to restrain the animal in the vehicle.

2. The animal restraint system of claim 1 wherein the vest is spherically shaped.

3. The animal restraint system of claim 1, and further including a tether strap for removably securing the vest to the seat belt of the vehicle, the tether strap having at least one loop through which the seat belt of the vehicle is passed to removably secure the tether strap to the seat belt.

4. The animal restraint system of claim 3 wherein the tether strap has a plurality of loops along its length, the seat belt passed through one of the plurality of loops to removably secure the tether strap to the seat belt.

5. The animal restraint system of claim 3, wherein the vest includes a vest jacket and reinforcing straps secured to the vest jacket.

6. The animal restraint system of claim 5 wherein the reinforcing straps include a peripheral strap extending around the vest jacket adjacent a periphery thereof and a chest strap extending from the peripheral strap on the front side of the vest jacket to the peripheral strap on the rear side of the vest jacket between the leg holes, the chest strap secured to the peripheral strap.

7. The animal restraint system of claim 3, and further including a top strap that extends across a back of an animal from a first side of the vest to a second side of the vest when the vest is on the animal to secure the vest to the animal, the tether strap removably securable to the top strap to secure the vest to the seat belt of the vehicle.

8. The animal restraint system of claim 7 wherein the vest includes a vest jacket, the top strap having a first end removably coupled to a first side of the vest jacket by a buckle.

9. The animal restraint system of claim 8 wherein the top strap includes a second end coupled to a second side of the vest jacket by a strap length adjuster.

10. The animal restraint system of claim 9 wherein the top strap is coupled to the vest jacket by at least two buckles and at least two strap length adjusters.

11. The animal restraint system of claim 8 wherein one of the top strap and the tether strap have a steel loop secured thereto and the other of the top strap and the tether strap has a clip secured thereto that clips to the steel loop to removably couple the tether strap to the top strap.

12. The animal restraint system of claim 11 wherein the steel loop is secured to the top strap by the top strap passing through the steel loop, and the clip is secured to a first end of the tether strap.

13. The animal restraint system of claim 7 wherein the top strap includes at least two top straps, each top strap coupled to the vest jacket by a buckle on the first side of the vest and a strap length adjuster on the second side of the vest jacket.

14. The animal restraint system of claim 13 wherein one of the at least two top straps and the tether strap have a steel loop secured thereto and the other of the at least two top straps and the tether strap has a clip secured thereto that clips to the steel loop to removably couple the tether strap to the top strap.

15. The animal restraint system of claim 14 wherein the steel loop is secured to the at least two top straps by the at least two top straps passing through the steel loop, and the clip is secured to a first end of the tether strap.

16. An animal restraint system for a vehicle, comprising:
(a) a vest having leg holes, the vest spherically shaped so that it is symmetrical about the leg holes;
(b) the vest having a vest jacket with reinforcing straps secured to an outer surface of the vest jacket;
(c) a top strap having first and second ends, a first end of the top strap removably couplable to a first side of the vest jacket above a first one of the leg holes by a buckle and the second end of the top strap adjustably secured to a second side of the vest jacket above a second one of the leg holes by a strap length adjuster; and
(d) a tether strap removably couplable to the top strap and having at least one loop at one end through which a seat belt of the vehicle passes to secure the tether strap to the seat belt of the vehicle.

17. The animal restraint system of claim 16 wherein the top strap passes through a steel loop to secure the steel loop to the top strap, the tether strap having a clip that removably clips to the steel loop.

18. The animal restraint of claim 17 wherein the reinforcing straps include a peripheral strap extending around the vest jacket adjacent a periphery thereof and a chest strap secured to the vest jacket and the peripheral strap, the chest strap extending between the leg holes from the peripheral strap on a front side of the vest to the peripheral strap on a rear side of the vest.

19. An animal restraint system for a vehicle, comprising:
 (a) a vest having leg holes, the vest spherically shaped so that it is symmetrical about the leg holes;
 (b) the vest having a vest jacket with reinforcing straps secured to an outer surface of the vest jacket;
 (c) at least two top straps, each top strap having first and second ends, each first end of each top strap removably couplable to a first side of the vest jacket above a first one of the leg holes by a buckle and each second end of each top strap adjustably secured to a second side of the vest jacket above a second one of the leg holes by a strap length adjuster; and
 (d) a tether strap removably couplable to the top straps and having at least one loop at one end through which a seat belt of the vehicle passes to secure the tether strap to the seat belt of the vehicle.

20. The animal restraint system of claim 19 wherein the top straps pass through a steel loop to secure the steel loop to the top straps, the tether strap having a clip that removably clips to the steel loop.

21. The animal restraint of claim 20 wherein the reinforcing straps include a peripheral strap extending around the vest jacket adjacent a periphery of the vest jacket and a chest strap secured to the vest jacket and the peripheral strap, the chest strap extending between the leg holes from the peripheral strap on a front side of the vest to the peripheral strap on a rear side of the vest.

22. The animal restraint system of claim 20 wherein the reinforcing straps further include reinforcing straps on opposite sides of the vest that extend between the peripheral strap above the leg holes of the vest.

23. The animal restraint system of claim 19 wherein the tether strap has a plurality of loops along its length, the seat belt passed through one of the plurality of loops to removably secure the tether strap to the seat belt.

24. A method of securing an animal in a vehicle, comprising:
 (a) placing front legs of the animal into leg holes of a vest of an animal restraint system that is coupled to a seat belt of the vehicle with either of a first and second side of the vest that are on opposite sides of the leg holes being in front of the front legs of the animal; and
 (b) securing the animal restraint system to the animal by passing at least one top strap secured to one side of the vest over one of the leg holes over a back of the animal and removably coupling the top strap to a second side of the vest over the other leg hole.

* * * * *

UNITED STATES PATENT AND TRADEMARK OFFICE
CERTIFICATE OF CORRECTION

PATENT NO. : 6,637,377 B2
DATED : October 28, 2003
INVENTOR(S) : Mark Lobanoff et al.

It is certified that error appears in the above-identified patent and that said Letters Patent is hereby corrected as shown below:

<u>Column 3,</u>
Line 15, after "of" delete "the".
Line 43, after "60" delete ";" and insert -- . --.

<u>Column 6,</u>
Line 64, after "restraint" insert -- system --.

<u>Column 7,</u>
Line 25, after "restraint" insert -- system --.

Signed and Sealed this

Twenty-third Day of March, 2004

JON W. DUDAS
*Acting Director of the United States Patent and Trademark Office*